United States Patent
Yoo et al.

(10) Patent No.: US 7,469,639 B2
(45) Date of Patent: Dec. 30, 2008

(54) PRINTING DEVICE AND METHOD OF COATING A PRINTING ROLL AND FABRICATING A LCD DEVICE USING THE PRINTING DEVICE

(75) Inventors: Hong Suk Yoo, Gunpo-si (KR); Tae Young Oh, Anyang-si (KR)

(73) Assignee: LG. Display Co., Ltd., Seoul (KR)

( * ) Notice: Subject to any disclaimer, the term of this patent is extended or adjusted under 35 U.S.C. 154(b) by 312 days.

(21) Appl. No.: 11/208,235

(22) Filed: Aug. 18, 2005

(65) Prior Publication Data

US 2006/0102036 A1 May 18, 2006

(30) Foreign Application Priority Data

Nov. 4, 2004 (KR) .................. 10-2004-0089310

(51) Int. Cl.
*B41F 3/00* (2006.01)
*B41F 11/00* (2006.01)

(52) U.S. Cl. .............. 101/483; 101/170; 101/215; 118/684

(58) Field of Classification Search ........... 101/335, 101/366, 170; 427/428.19, 420; 118/46, 118/304, 315, 410, 414; *B41F 3/20; B05C 1/08*
See application file for complete search history.

(56) References Cited

U.S. PATENT DOCUMENTS

| | | | |
|---|---|---|---|
| 4,191,213 A | | 3/1980 | Dolling et al. |
| 4,995,333 A | * | 2/1991 | Keller et al. ............... 118/300 |
| 5,264,036 A | * | 11/1993 | Haas et al. ................. 118/315 |
| 5,702,527 A | * | 12/1997 | Seaver et al. ............... 118/410 |
| 5,863,332 A | * | 1/1999 | Foster et al. ............... 118/314 |
| 6,428,845 B1 | * | 8/2002 | Vesterlund ................ 427/208.6 |
| 6,478,483 B2 | * | 11/2002 | Maruyama et al. ............ 396/604 |

(Continued)

FOREIGN PATENT DOCUMENTS

CN  1514283 A  7/2004

(Continued)

OTHER PUBLICATIONS

Office Action for corresponding Chinese Patent Application Serial No. 2005101157523, dated Sep. 14, 2007.

(Continued)

*Primary Examiner*—Daniel J Colilla
*Assistant Examiner*—Marissa L Ferguson-Samreth
(74) *Attorney, Agent, or Firm*—Brinks Hofer Gilson & Lione (57) ABSTRACT

A printing device includes a main body and a plurality of nozzle units on a lower portion of the main body, a plurality of accommodation grooves within the main body and configured to contain a printing material, and a plurality of slits in each nozzle unit and each slit connected to an accommodation groove, so as to coat the printing material onto a printing object. Since the printing device includes a plurality of nozzle units that can individually control the amount of printing material flowing out of the printing device, the amount of printing material can be easily controlled and regulated. A method of using the printing device includes coating a printing roll with the printing material.

17 Claims, 5 Drawing Sheets

U.S. PATENT DOCUMENTS 6,689,215 B2 * 2/2004 Nguyen ............... 118/313

FOREIGN PATENT DOCUMENTS

| | | | |
|---|---|---|---|
| JP | 05-011270 | | 1/1993 |
| JP | 06-000939 | | 1/1994 |
| JP | 06-023948 | | 2/1994 |
| JP | 06-166165 | | 6/1994 |
| JP | 07-140314 | | 6/1995 |
| JP | 11058921 | * | 2/1999 |
| JP | 11-058921 | | 3/1999 |
| JP | 11-091229 | | 4/1999 |
| JP | 11-198337 | | 7/1999 |
| JP | 11198337 | * | 7/1999 |
| JP | 2000-289320 | | 10/2000 |
| JP | 2001-056405 | | 2/2001 |
| JP | 2002-136909 A | | 5/2002 |
| JP | 2002-282760 A | | 10/2002 |

OTHER PUBLICATIONS

Office Action issued in corresponding Chinese Patent Application No. 200510115752.3; issued Jul. 18, 2008.

* cited by examiner

PRINTING DEVICE AND METHOD OF COATING A PRINTING ROLL AND FABRICATING A LCD DEVICE USING THE PRINTING DEVICE

This application claims the benefit of Korean Application No. P2004-89310, filed on Nov. 4, 2004, which is hereby incorporated by reference herein.

FIELD OF THE INVENTION

The present invention relates to a printing device for forming a pattern in liquid crystal display devices and semiconductor devices, and more particularly, to a printing device for coating a printing material onto a printing roll or a printing plate.

BACKGROUND

A liquid crystal display device and a semiconductor device are formed of a plurality of layers patterned on a substrate. A plurality of processes is carried out for forming and patterning the layers on the substrate. And, generally, various methods, such as a chemical vapor deposition method, a sputtering method, a photoresist method, and so on, are used for such processes. However, since a large number of layers are required to be formed on the substrate, productivity may be decreased if the fabrication process is complicated. Therefore, it is necessary to adopt a simple fabrication process in case mass production is desired.

A related art printing nozzle will now be described in detail with reference to the accompanying drawings.

Figure 1A:
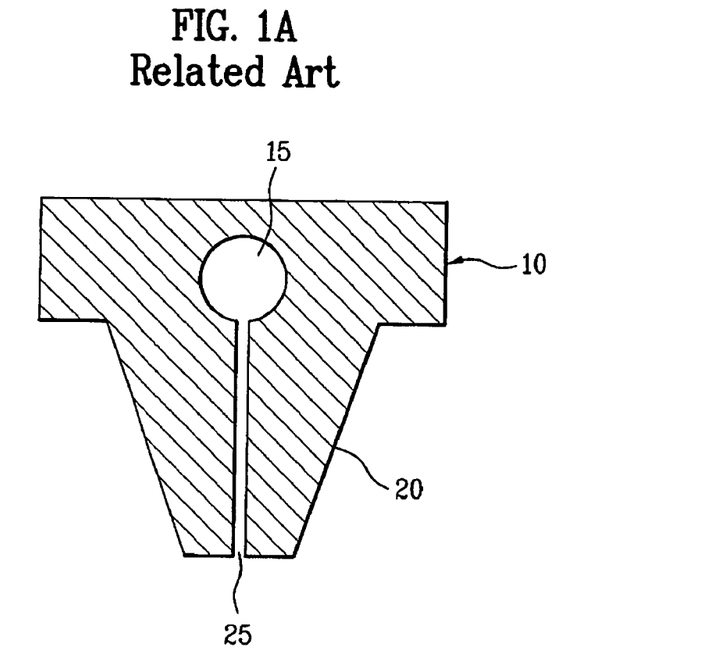
FIG. 1A illustrates a cross-sectional view of a related art printing device.

FIG. 1A illustrates a cross-sectional view of a related art printing device. And, FIG. 1B illustrates a process of coating a printing material onto a printing roll by using the related art printing device.

Referring to FIG. 1A, the related art printing device includes a main body 10 and a nozzle unit 20, which is formed on a lower portion of the main body 10. The main body 10 includes an accommodation groove 15 for accommodating (or containing) a printing material. The nozzle unit 20 includes a slit 25 that is connected to the accommodation groove 15 of the main body. The slit 25 allows the printing material to flow out in order to perform coating.

Figure 1B:
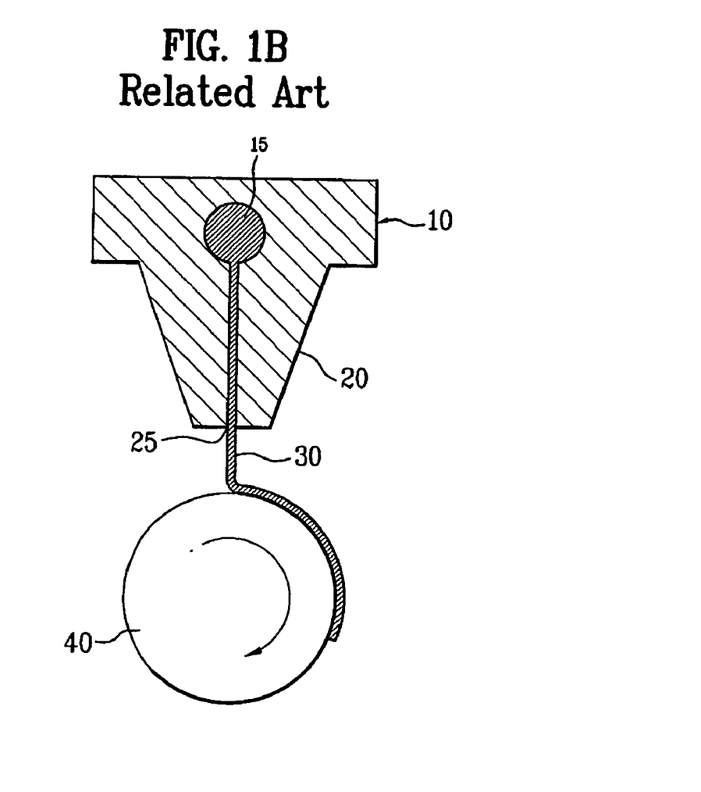
FIG. 1B illustrates a process of coating a printing material onto a printing roll by using the related art printing device.

Referring to FIG. 1B, the printing material 30 contained in the accommodation groove 15 of the main body 10 flows out through the slit 25 of the nozzle unit 20. A layer of the printing material 30 is then coated on a printing roll 40, which rotates below the printing device. At this point, since the related art printing device includes one nozzle unit 20 formed on the lower portion of the main body 10, the amount of printing material 30 flowing out of the printing device cannot be controlled or regulated.

In FIG. 1B, a thickness of the layer of printing material 30 that is coated onto the printing roll 40 may be controlled by controlling or regulating the amount of printing material 30 flowing out of the printing device. However, since the amount of the printing material itself cannot be controlled, as described above, the thickness of the coating layer may be controlled by adequately adjusting the rotation speed of the printing roll 40.

Yet, there is a limitation in adjusting the thickness of the coating layer by simply controlling the rotation speed of the printing roll 40. Most particularly, when the printing material 30 is to be coated to a thickness that cannot be controlled by adjusting the rotation speed of the printing roll 40, the printing roll 40 must be rotated several times, which extends the fabrication process time. Moreover, if a flat printing plate is to be coated instead of the printing roll 40, shown in FIG. 1B, either the printing plate or the printing device should make repeated back-and-forth movements, thereby preventing the printing material from being coated at a uniform thickness.

BRIEF SUMMARY

Accordingly, the present invention is directed to a printing device that substantially obviates one or more problems due to limitations and disadvantages of the related art.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the invention, as embodied and broadly described herein, a printing device includes a main body and having a plurality of nozzle units, a plurality of accommodation grooves within the main body and configured to contain a printing material, and at least one slit in each nozzle unit, wherein each slit is in fluid communication with the accommodation grooves, so as to enable coating the printing material onto a printing object.

In another embodiment of the invention, a printing device includes a main body including a plurality of subunits and a plurality of nozzle units on a lower portion of the main body. A plurality of accommodation grooves that reside within the main body are configured to contain a printing material. At least one slit resides in each nozzle unit, wherein each slit is in fluid communication with one of the accommodation grooves.

In yet another embodiment, a method of coating a printing roll includes providing a main body having a plurality of nozzle units and at least one accommodation groove within the main body configured to contain a printing material. The printing material flows from at least one slit in each nozzle unit onto the printing roll, where each slit is in fluid communication with one of the accommodation grooves, so as to enable coating of the printing material onto the printing roll.

In still another embodiment, a method of fabricating an LCD device includes coating a printing roll by providing a main body having a plurality of nozzle units, at least one accommodation groove within the main body and configured to contain a printing material, and flowing the printing material from at least one slit in each nozzle unit onto the printing roll. Each slit is in fluid communication with one of the accommodation grooves. The printing roll is rotated to print the printing material on an LCD substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 2A:
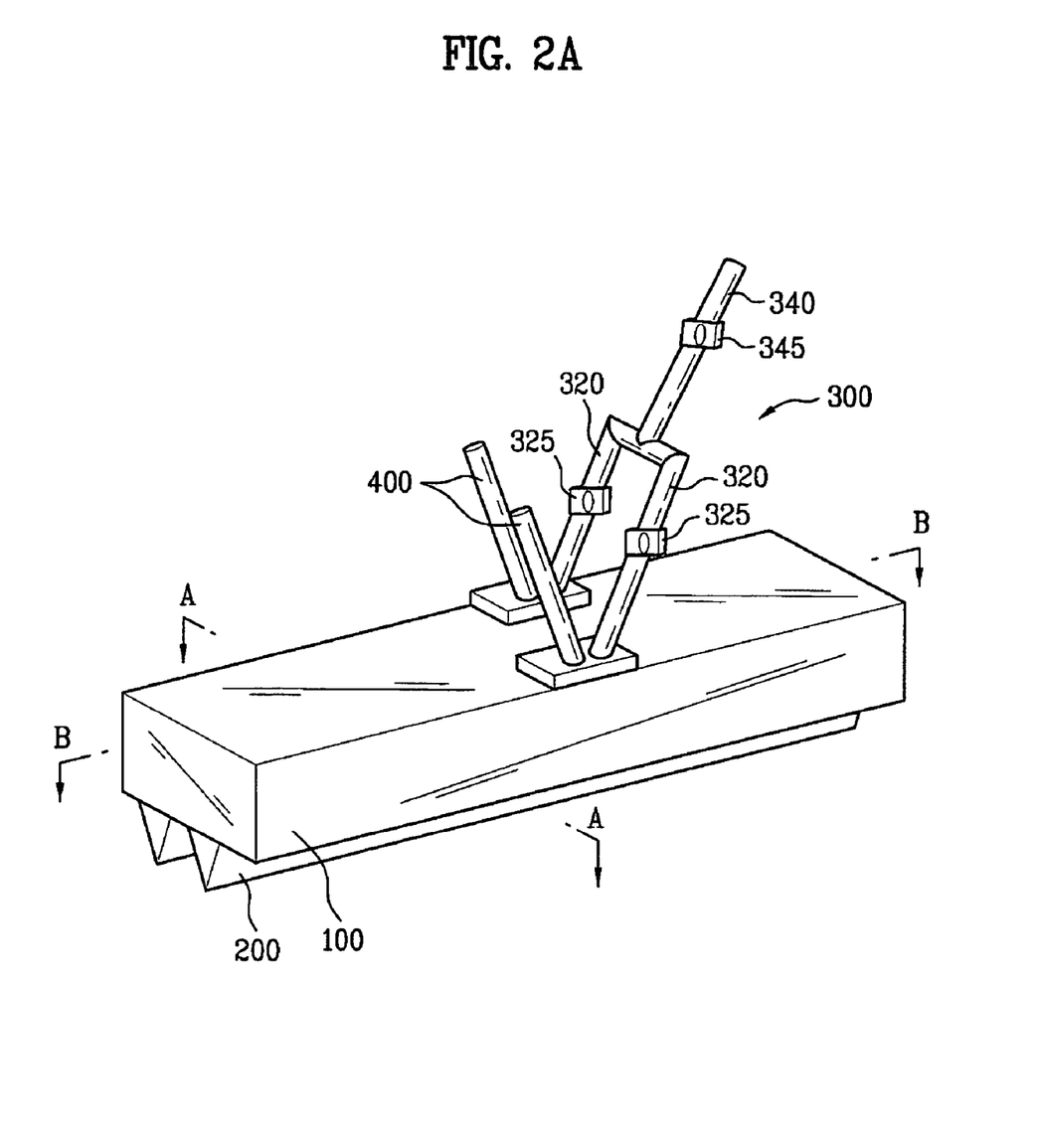
FIG. 2A illustrates a perspective view of a printing device according to an embodiment of the present invention.
Figure 2B:
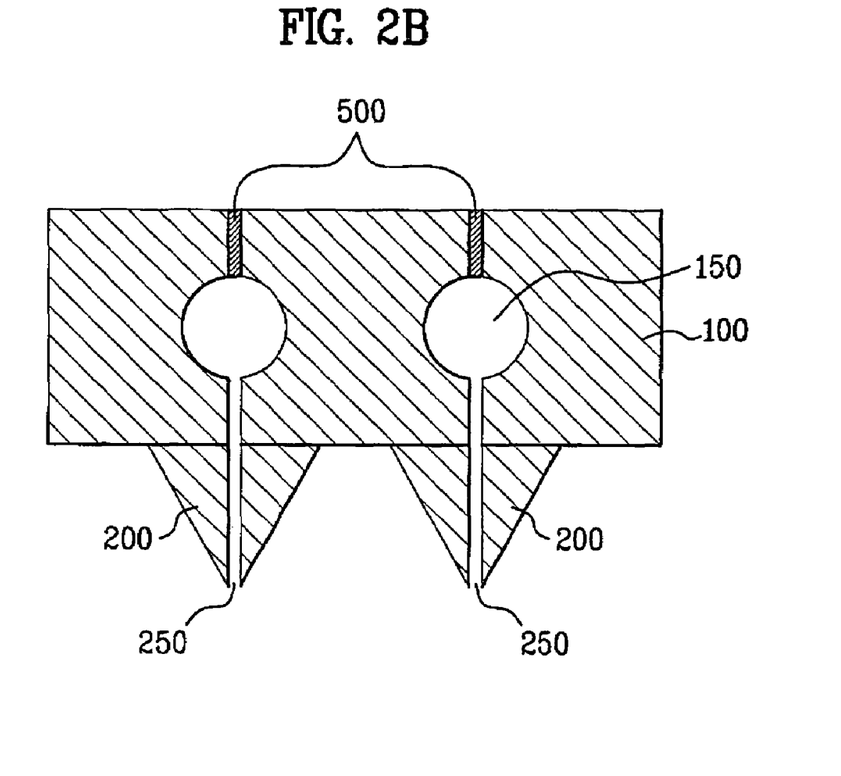
FIG. 2B illustrates a cross-sectional view taken along line A-A of FIG. 2A.

FIG. 2A illustrates a perspective view of a printing device according to an embodiment of the present invention. FIG. 2B illustrates a cross-sectional view taken along line A-A of FIG. 2A. And, FIG. 2C illustrates a cross-sectional view taken along line B-B of FIG. 2A.

As shown in FIG. 2A, the printing device according to the present invention includes a main body 100, a plurality of nozzle units 200, a supply tube 300, and an exhaust tube 400. The plurality of nozzle units 200 is formed on a lower portion of the main body 100. The supply tube 300 supplies the main body 100 with a printing material, and the exhaust tube 400 allows the printing material to be exhausted from (or flown out of) the main body 100. Although only two nozzle units are illustrated in FIG. 2A, it is only exemplary and the present invention is not limited only to this structure.

Figure 2C:
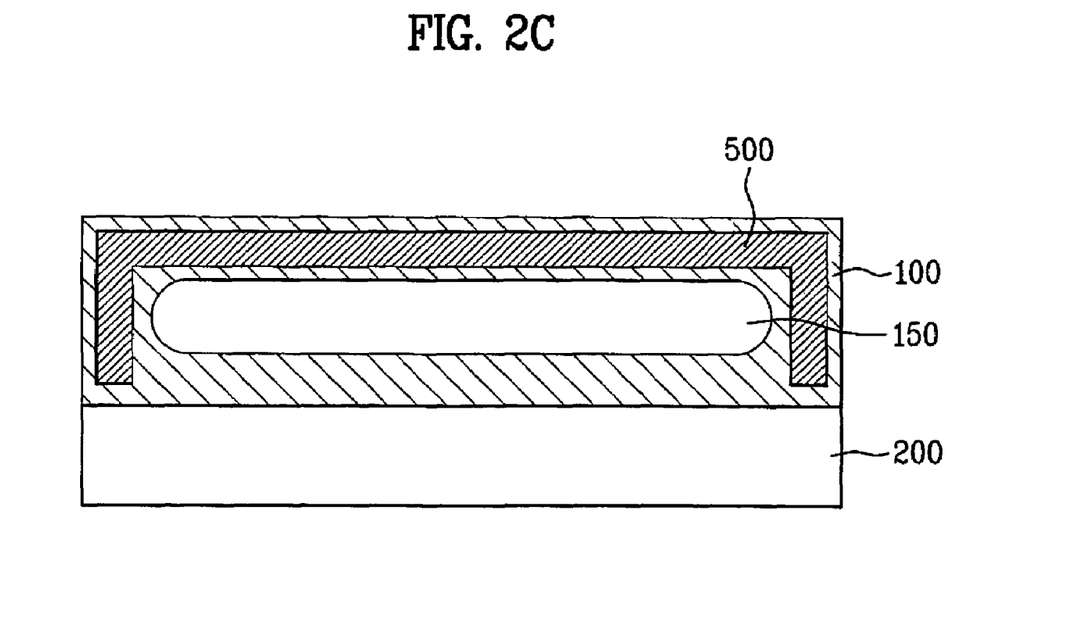
FIG. 2C illustrates a cross-sectional view taken along line B-B of FIG. 2A.

Referring to FIG. 2B and FIG. 2C, a plurality of accommodation grooves 150 for accommodating (or containing) the printing material is formed within the main body 100. Also, a slit 250 is formed in each nozzle unit 200, each slit 250 being connected to each accommodation groove 150 of the main body 100. The slits 250 allow the printing material to flow out so as to form a coating layer on an object that is to be printed (i.e., a printing object). A spacer 500 is formed inside the main body 100. The width of the spacer 500 can be adjusted in order to adjust the size of the slit 250.

Referring back to FIG. 2A, the supply tube 300 connected to the main body 100 is formed of a plurality of sub supply tubes 320 and a main supply tube 340. Each of the sub supply tubes 320 is connected to a respective accommodation groove 150 and provides the printing material thereto. All of the sub supply tubes 320 are connected to the main supply tube 340. The main supply tube 340 includes a main valve 345, which controls and regulates the amount of printing material flowing into the sub supply tube 320. The sub supply tube 320 includes a sub valve 325, which controls and regulates the amount of printing material flowing into the accommodation groove 150.

As described above, the printing material is accommodated (or contained) in the plurality of accommodation grooves 150 through each sub supply tube 320. Then, the printing material flows out through the plurality of slits 250 so as to be coated onto the object that is to be printed (i.e., a printing object). The overall amount of printing material flowing into the slits 250 is regulated by the main valve 345. At the same time, the amount of printing material flowing into each accommodation groove 150 is adjusted individually by each corresponding sub valve 325. Therefore, the amount of printing material flowing out can be controlled and regulated as desired, allowing the thickness of the coated layer of printing material to be controlled, thereby enabling a relatively thick coating layer to be formed through a single fabrication process.

Furthermore, the plurality of exhaust tubes 400 is formed to be connected to each accommodation groove 150 in order to exhaust the printing material remaining within the plurality of accommodation grooves 150 outside of the printing device. Moreover, the printing device needs to be washed and cleaned regularly. And so, either the remaining printing material (i.e., printing material residue) should be exhausted from the printing device before the washing process, or residue of a washing liquid that is used to clean the printing device should be exhausted from the printing device after the washing process. In other words, the exhaust tubes 400 are formed to allow printing material residue or washing liquid residue to be exhausted from the printing device.

Figure 3A:
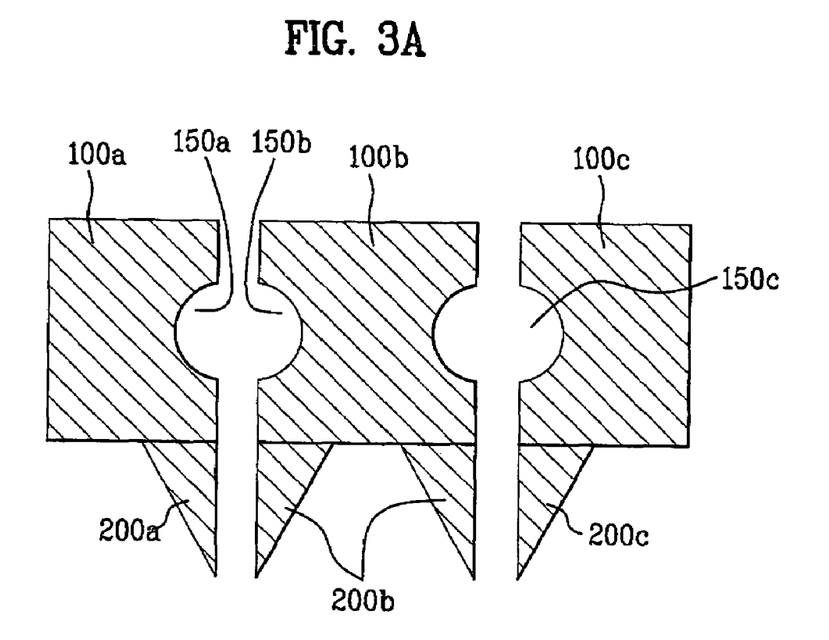
FIGS. 3A and 3B illustrate cross-sectional views of the printing device according to the embodiment of the present invention prior to combination.
Figure 3B:
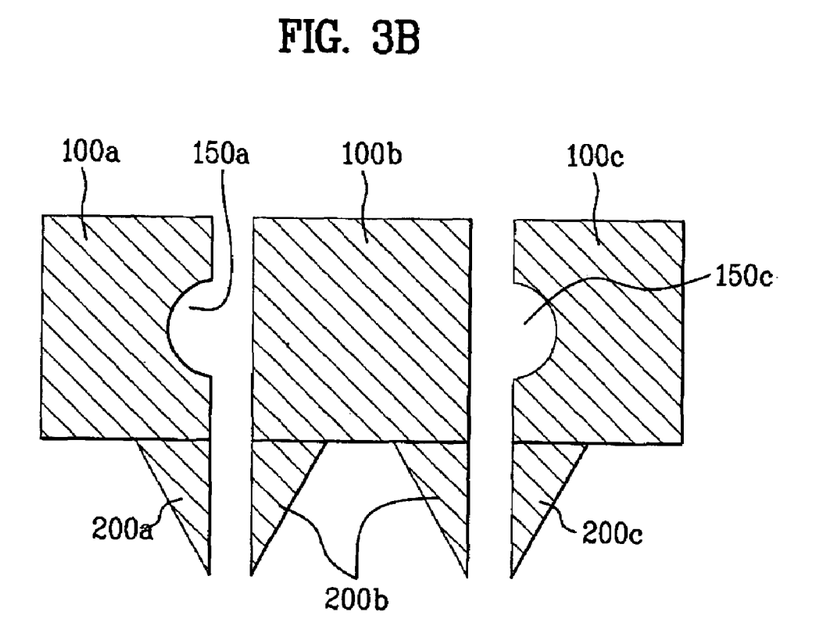

As shown in FIG. 3A and FIG. 3B, the printing device according to the present invention can be formed by combining a plurality of sub printing nozzles. Each sub printing nozzle is formed of a sub body (100a, 100b or 100c) and a sub nozzle unit (200a, 200b or 200c). Therefore, the nozzle unit is formed by combining two neighboring sub nozzle units (e.g., a combination of 200a and 200b or a combination of 200b and 200c). The slit of the nozzle unit corresponds to a spacer formed between the sub nozzle units. The accommodation groove formed within the main body may be formed by combining two neighboring sub accommodation grooves formed in the sub body (e.g., a combination of 150a and 150b or a combination of 150b and 150c), as shown in FIG. 3A. Alternatively, the accommodation groove may be formed of the sub accommodation grooves (150a and 150c) formed in part of the sub bodies, as shown in FIG. 3B.

Figure 4A:
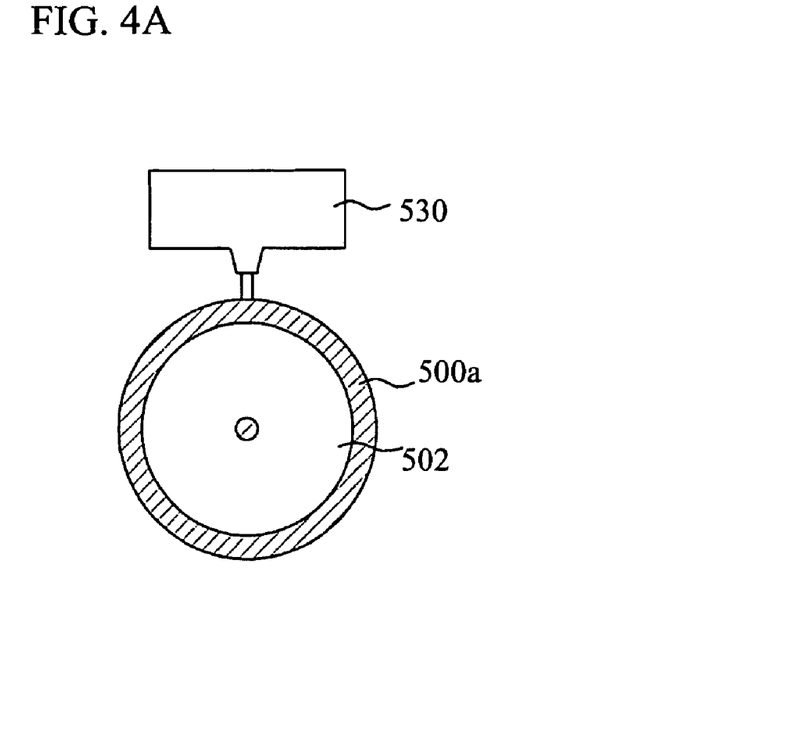
FIGS. 4A and 4B are sectional views illustrating a method of forming a substrate for an LCD device according to an embodiment of the present invention.

In accordance with an aspect of the invention, the printing device described above can be used to coat a layer of printing material on a printing roll and the printing roll, can in turn, be used to print the printing material on an LCD substrate. As shown in FIG. 4A, a printing material 500a is deposited on a printing roll 502 using a printing nozzle 530 arranged in accordance with one of the embodiments described above.

Figure 4B:
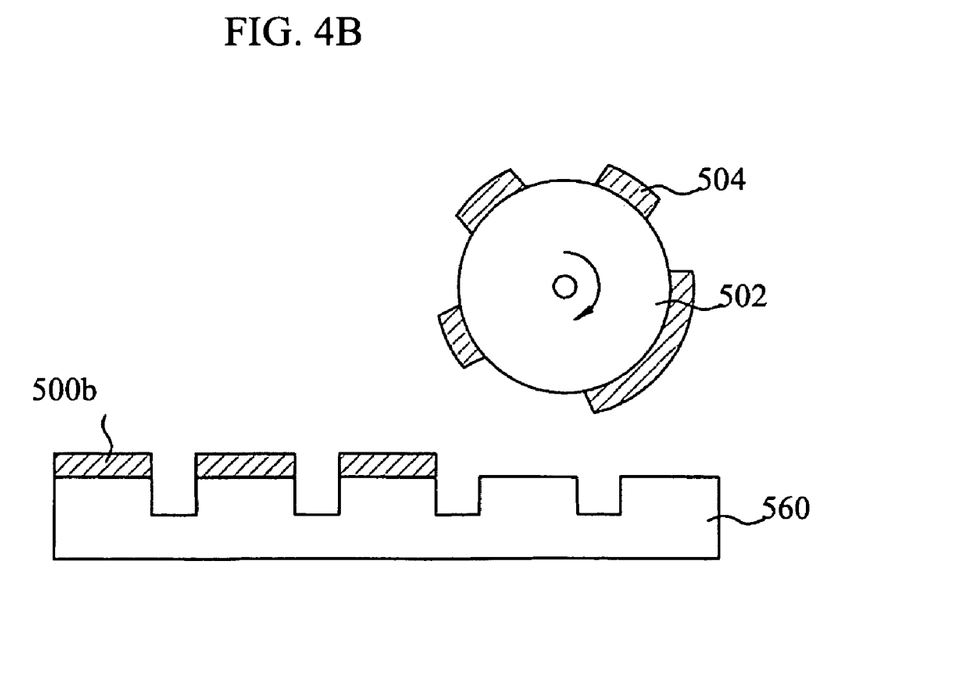

Then, as shown in FIG. 4B, the printing roll 502 is rotated on a printing plate 560 provided with a projection having a predetermined shape so that a printing material 500b is partially transferred onto the projection of the printing plate 560 to form a pattern 500 having a predetermined shape in the printing roll 502. The printing roll 502 is then subsequently used to transfer the pattern 500 onto an LCD substrate (not shown). Alternatively, the printing material 500a can be transferred directly to an LCD substrate without using a patterning step.

As described above, the printing device according to the present invention has the following advantages. By including a plurality of nozzle units capable of controlling and regulating the amount of printing material individually, the amount of printing material flowing out of the printing device, which is to be coated onto a printing roll or a printing plate, can be easily controlled and regulated. Thus, the thickness of the coated layer of printing material can be easily controlled, thereby enabling the printing material to be coated at a uniform thickness through a single fabrication process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A printing device comprising:
   a main body having a plurality of nozzle units, wherein the main body further comprises a plurality of sub bodies, each sub body having a sub nozzle unit;
   a plurality of accommodation grooves within the main body and configured to contain a printing material;
   at least one slit in each nozzle unit, wherein each slit is in fluid communication with one of the accommodation grooves, so as to enable coating of the printing material onto a printing object directly through the at least one slit;
   a plurality of sub supply tubes coupled to each accommodation groove and configured to supply the printing material to the plurality of accommodation grooves;
   a sub valve residing in each sub supply tube and configured to variably control an amount of printing material flowing out of the printing device, and
   a spacer between each sub body, wherein a width of the spacer determines a slit size of the nozzle unit.

2. The printing device of claim 1, further comprising a main supply tube coupled to the plurality of sub supply tubes and configured to join the sub supply tubes thereto.

3. The printing device of claim 1, further comprising a plurality of exhaust tubes coupled to each accommodation groove and configured to exhaust residue of the printing material remaining within the accommodation grooves out of the printing device.

4. The printing device of claim 1, wherein an accommodation groove resides in a portion of the plurality of sub bodies.

5. The printing device of claim 1, wherein an accommodation groove resides in each of the plurality of sub bodies.

6. The printing device of claim 1, wherein the printing material comprises one of a black matrix material, a color filter material, a photoresist material, or an overcoat material.

7. A printing device comprising:
   a main body comprising a plurality of sub bodies;
   a plurality of nozzle units in a lower portion of the main body;
   a plurality of accommodation grooves within the main body and configured to contain a printing material;
   at least one slit in each nozzle unit, wherein each slit is in fluid communication with one of the accommodation grooves and directly coats the printing material onto a printing object; and
   wherein the plurality of accommodation grooves reside at an interface between each of the plurality of sub bodies
   wherein a spacer separates each of the plurality of sub bodies and defines the size of each slit.

8. The printing device of claim 7, wherein the accommodation grooves comprise a groove at the interface, and wherein the groove resides in one of two adjoining sub bodies.

9. The printing device of claim 7, wherein the accommodation grooves comprise a groove at the interface, and wherein the groove resides in both of two adjoining sub bodies.

10. The printing device of claim 7, wherein each of the plurality of nozzle units comprises two body portions, and wherein each body portion depends from a different sub body.

11. A method of coating a printing roll comprising:
    providing a main body having a plurality of nozzle units;
    providing at least one accommodation groove within the main body configured to contain a printing material;
    providing a plurality of sub supply tubes coupled to each accommodation groove and supplying the printing material to the plurality of accommodation grooves through the sub supply tubes;
    providing a sub valve residing in each sub supply tube;
    variably controlling an amount of printing material flowing out of the main body with each sub valve; and
    flowing the printing material from at least one slit in each nozzle unit directly onto the printing roll, wherein each slit is in fluid communication with one of the accommodation grooves so as to enable coating of the printing material onto the printing roll, wherein providing a main body comprises providing a plurality of sub bodies, each sub body having a sub nozzle unit, and further comprising providing a spacer between each sub body, wherein a width of the spacer determines a slit size of the nozzle unit.

12. The method of claim 11, wherein flowing the printing material comprises coating the printing material to a substantially uniformly thickness on the printing roll.

13. The method of claim 11, wherein coating a printing roller comprises coating with one of a black matrix material, a color filter material, a photoresist material, or an overcoat material.

14. A method of fabricating an LCD device comprising:
    a) coating a printing roll by providing a main body having a plurality of nozzle units, providing at least one accommodation groove within the main body configured to contain the printing material, and flowing a printing material from at least one slit in each nozzle unit onto the printing roller, wherein each slit is in fluid communication with one of the accommodation grooves; and
    b) rotating the printing roller to print the printing material on an LCD substrate;
    c) wherein providing a main body comprises providing a plurality of sub bodies, each sub body having a sub nozzle unit, and further comprising providing a spacer between each sub body, wherein a width of the spacer determines a slit size of the nozzle unit.

15. The method of claim 14, wherein coating a printing roll comprises coating with one of a black matrix material, a color filter material, a photoresist material, or an overcoat material.

16. The method of claim 14, wherein providing a main body further comprises providing a plurality of sub supply tubes coupled to each accommodation groove and supplying the printing material to the plurality of accommodation grooves through the sub supply tubes.

17. The method of claim 16, further comprising providing a sub valve residing in each sub supply tube and controlling an amount of printing material flowing out of the main body with the sub valve.

* * * * *

UNITED STATES PATENT AND TRADEMARK OFFICE
CERTIFICATE OF CORRECTION

| | | |
|---|---|---|
| PATENT NO. | : 7,469,639 B2 | Page 1 of 1 |
| APPLICATION NO. | : 11/208235 | |
| DATED | : December 30, 2008 | |
| INVENTOR(S) | : Hong Suk Yoo et al. | |

It is certified that error appears in the above-identified patent and that said Letters Patent is hereby corrected as shown below:

<u>In the Claims</u>

Column 6, after claim 15, line 50 (before claim 16), insert the following:

--16. The method of claim 14, wherein coating a printing roll comprises coating the printing material to a substantially uniformly thickness on the printing roll.--.

Column 6, line 50, claim "16" should be renumbered as --17--.

Column 6, line 55, claim "17" should be renumbered as --18-- and in line 1 delete "claim 16" and substitute --claim 17-- in its place.

Signed and Sealed this

Twenty-eighth Day of July, 2009

JOHN DOLL
*Acting Director of the United States Patent and Trademark Office*